United States Patent [19]
Yamashita et al.

[11] Patent Number: 5,696,557
[45] Date of Patent: Dec. 9, 1997

[54] VIDEO SIGNAL EDITING APPARATUS

[75] Inventors: Yoshiharu Yamashita; Kazuo Kamiyama; Toru Eto, all of Kanagawa, Japan

[73] Assignee: Sony Corporation, Tokyo, Japan

[21] Appl. No.: 628,616

[22] PCT Filed: Aug. 14, 1995

[86] PCT No.: PCT/JP95/01616

§ 371 Date: Jul. 8, 1996

§ 102(e) Date: Jul. 8, 1996

[87] PCT Pub. No.: WO96/05697

PCT Pub. Date: Feb. 22, 1996

[30] Foreign Application Priority Data

Aug. 12, 1994 [JP] Japan ................... 6-190746

[51] Int. Cl.$^6$ .................................. H04N 5/915
[52] U.S. Cl. ................... 348/390; 348/314; 386/111
[58] Field of Search ...................... 348/390, 394, 348/700, 409, 415; 386/4, 52, 55, 64, 109, 111, 112

[56] References Cited

U.S. PATENT DOCUMENTS

| | | | |
|---|---|---|---|
| 4,931,879 | 6/1990 | Koga et al. | 386/111 |
| 5,168,356 | 12/1992 | Acampora et al. | 348/409 |
| 5,191,436 | 3/1993 | Yonemitsu | 386/52 |
| 5,367,341 | 11/1994 | Schnorf | 348/616 |
| 5,543,847 | 8/1996 | Kato | 348/415 |
| 5,631,742 | 5/1997 | Shimoda | 386/52 |

FOREIGN PATENT DOCUMENTS

| | | |
|---|---|---|
| 61-201570 | 9/1986 | Japan. |
| 63-168663 | 11/1988 | Japan. |
| 2-174387 | 7/1990 | Japan. |
| 3-250887 | 11/1991 | Japan. |
| 4-68989 | 3/1992 | Japan. |
| 5-7356 | 1/1993 | Japan. |
| 5-176296 | 7/1993 | Japan. |
| 6-68606 | 3/1994 | Japan. |

*Primary Examiner*—Howard W. Britton
*Assistant Examiner*—Frank Snow
*Attorney, Agent, or Firm*—William S. Frommer; Alvin Sinderbrand

[57] ABSTRACT

Provision is made of a video signal editing apparatus wherein even if coded video signals subjected to inter-frame coding are connected and edited, no disturbance occurs in the video signal obtained as a result. Therefore, when connecting coded video signals in each of which one B-frame and I-frame constitute a GOP in that order, if the B-frame comes at the end of a coded video signal, the signal is divided adding to it up to the I-frame of the same or subsequent GOP. Further, if the B-frame comes at the start of a coded video signal, the signal is divided adding to it up to the B-frame or I-frame of the same or previous GOP, then these coded video signals are connected.

5 Claims, 11 Drawing Sheets

TRANSMISSION RATE 270Mbps SERIAL

TRANSMISSION RATE : 270Mbps SERIAL

VIDEO SIGNAL EDITING APPARATUS

TECHNICAL FIELD

The present invention relates to a video signal editing apparatus which connects a plurality of coded video signals, compressed and coded by inter-frame compression and coding, and edits the same.

BACKGROUND ART

Video signal compression and coding apparatuses are being developed which take note of the correlation of the video data among a plurality of frames contained in a video signal and use the video compression technology of, for example, the MPEG (Motion Picture Expert Group) method to perform inter-frame compression and coding of the video signal so as to establish correlation among the plurality of frames and thereby generate a coded video signal. The coded video signal obtained by compression and coding by such a video signal compression and coding apparatus is divided into groups of a plurality of frames serving as the units at the time of decoding. Editing is sometimes performed by connecting (combining) a plurality of coded video signals subjected to inter-frame predictive coding (inter-frame compression and coding) in this way. When expanding and decoding coded video signals edited in this way; the image is sometimes disturbed at the points where the coded video signals were connected (edited) depending upon the nature of the coded signals.

Below, such a disturbance of video signals will be explained taking as an example a case of decoding two coded video signals a and b wherein bi-directional frames (B-frames) requiring video data of the two adjoining frames and intra-frames (I-frames) which are complete by the video data of those frames themselves and do not require the video data of other frames when decoding the video data of those frames are arranged in that order and two frames of a B-frame and an I-frame comprise a group.

Where connecting two coded video signals a and b by an alternate arrangement of B-frames and I-frames, first it is necessary to divide the coded video signals a and b at the connection timing and connect the two signals from there. When the timing of connection of the two signals corresponds to the B-frames of both or either of the coded video signals a and b, if the coded video signals a and b are simply connected, at the time of decoding, it is necessary to decode the video data of the B-frame existing at the editing position by using the video data of another frame. Explaining this in more detail, when there is a B-frame at the editing position of the coded video signal a, the video data of the B-frame of the coded video signal a is decoded by using the video data of the I-frame or B-frame of the coded video signal b. The coded video signals a and b generally do not have any inter-relationship, so the video data at the editing position cannot be normally decoded and therefore a disturbance occurs in the obtained image.

DISCLOSURE OF THE INVENTION

The present invention was made in consideration of the problems of the related art and has as an object thereof to provide a video signal editing apparatus with which no disturbance is generated in the image either when connecting and editing video signals coded by inter-frame coding or when decoding video signals obtained as a result of editing to reproduce an image.

According to the present invention, there is provided a video signal editing apparatus for connecting a plurality of coded video signals, wherein each of the coded video signals is divided into groups each comprised by a plurality of frames containing at least one intra-frame; the intra-frames are coded so that original video data can be decoded from only the video data contained in those frames; the video data of the frames other than the intra-frames of the groups require the video data of other frames when decoded to the original video data; and provision is made of a signal processing means for dividing each of the plurality of coded video signals at a timing of connection of the coded video signals so that the boundaries of the groups become ends of the coded video signals and a video signal superimposing means for superimposing the coded video signals divided by the signal processing means to connect the same.

The signal processing means cuts each of the coded video signals to be connected so that the B-frame or, when decoding the video data of that frame, the pre-direction prediction frame (P-frame) requiring the video data of the frame before that frame does not come at the end to be connected to the other coded video signal so as to enable decoding of each of the coded video signals complete in themselves. That is, the signal processing means divides (cuts) the coded video signals so that the first frames or last frames of the groups (boundaries of the group) or I-frames come at the ends of the coded video signals to be connected to other coded video signals.

The signal superimposing means superimposes the coded video signals divided by the signal processing means and prevents gaps in the video signal by adding "flaps" (overlapping portions).

BRIEF DESCRIPTION OF THE DRAWINGS

The above object and features and other objects and features of the present invention will become more apparent from the following description with reference to the accompanying drawings, wherein:

FIGS. 5A to 5D are views explaining the operation of the video signal editing apparatus shown in FIG. 1, in which

FIGS. 6A and 6B are views of the coded video signal output from the connection device shown in FIG. 1 where the B-frame and I-frame of the coded video signals X and Y, respectively, correspond to the editing position, in which

FIGS. 7A and 7B are views of the coded video signal output from the connection device shown in FIG. 1 where the I-frame and B-frame of the coded video signals X and Y, respectively, correspond to the editing position, in which

FIGS. 8A and 8B are views of the coded video signal output from the connection device shown in FIG. 1 where B-frames of the coded video signals X and Y correspond to the editing position, in which

FIGS. 9A and 9B are views of the coded video signal output from the connection device shown in FIG. 1 where the I-frames of the coded video signals X and Y correspond to the editing position, in which

BEST MODE FOR CARRYING OUT THE INVENTION

First Embodiment

Below, a first embodiment of the video signal editing apparatus of the present invention will be explained.

The configuration of the video signal editing apparatus 1 of the present invention will be explained by referring to FIG. 1.

Figure 1:
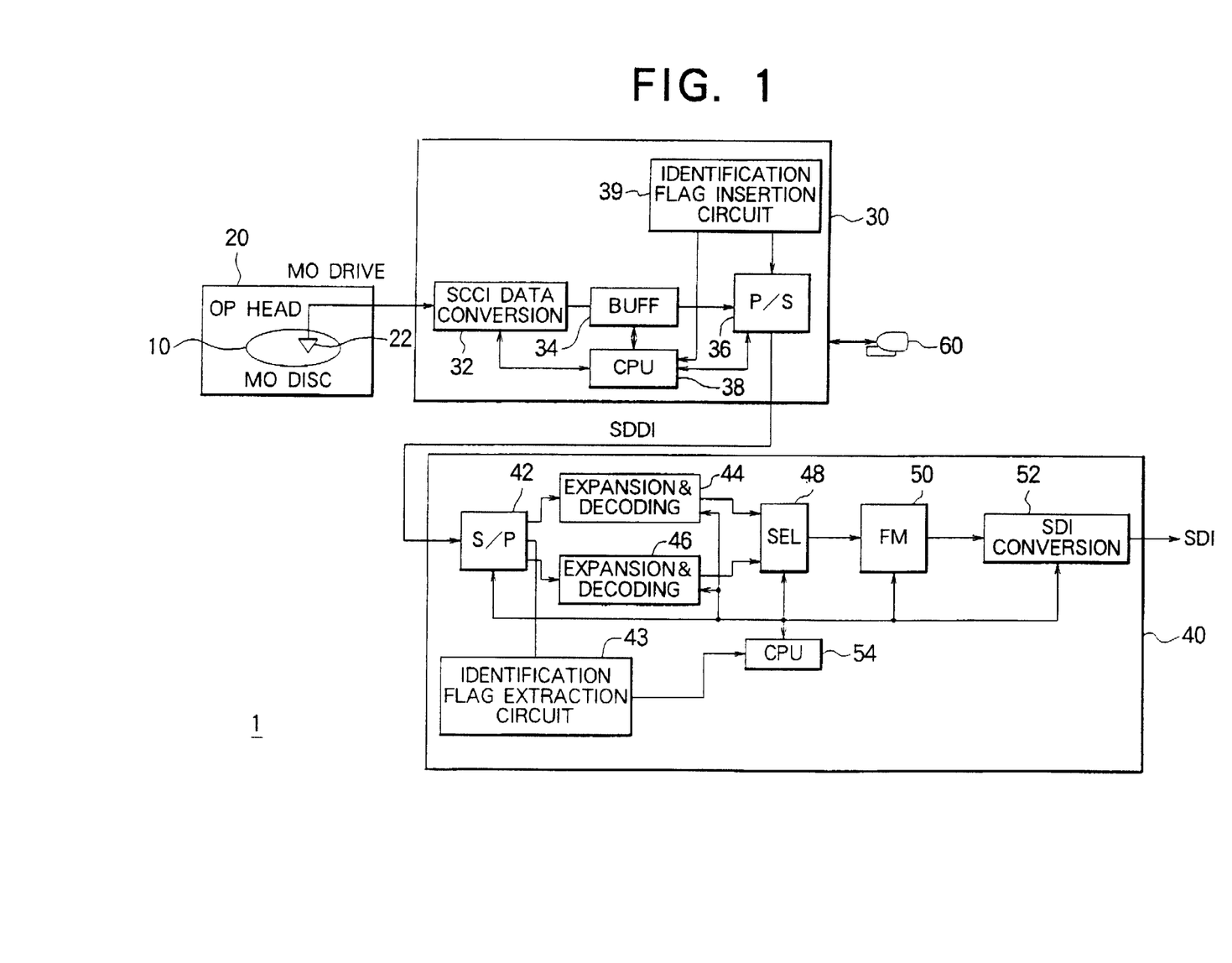
FIG. 1 is a view of the configuration of a video signal editing apparatus of the present invention.

FIG. 1 is a view of the configuration of the video signal editing apparatus 1 of the present invention.

The video signal editing apparatus 1 is constituted by a magneto-optical disc drive (MO drive) 20 which reproduces coded video signals from a magneto-optical disc (MO) 10 on which video signals are recorded in a coded state, a signal converting and connecting device 30, an expansion and decoding device 40, and a terminal apparatus 60.

The MO disc 10 has recorded on it coded video signals obtained by compression and coding by inter-frame predictive coding (inter-frame compression and coding) by for example the MPEG (Motion Picture Expert Group) system. Explaining this in more detail, the coded video signals recorded on for example the MO disc 10 comprise alternate bi-directional frame (B-frame) video signals requiring the video data of the two adjoining frames when decoding those frames of the video signals and intra-frame (I-frame) video signals which are complete by the video data of those frames per se and do not require the video data of other frames when decoding the video data of those frames. The B-frame video signals and the I-frame video signals are arranged in that order with two frames constituting one group (this will be referred to as a "group of pictures" (GOP)).

Further, at the heads of the frames of each of the coded video signals X and Y, identification flags used for identifying the two types of the coded video signals X and Y are provided. Note that, the term "the coded video signals X and Y" is used for the purpose of indicating any state such as for example X=I-frame video signal and Y=B-frame or, conversely, X=B-frame video signal and Y=I-frame.

The MO disc drive 20 reads the coded video signals recorded on the MO disc 10 via an optical head 22 in a predetermined order and at a predetermined timing according to the editing position designated by the terminal apparatus 60. The method of reading the coded video signals recorded on the MO disc 10 in the MO disc drive 20 will be explained later referring to FIG. 5 to FIG. 11.

The editing position designated by the terminal apparatus 60 is designated by a time code etc. generally used for the editing by a VTR etc. Whether the designated time code is a B-frame or an I-frame is determined when coding a video signal. In the present embodiment, it is determined so that a B-frame becomes an even number frame of the time code, and an I-frame becomes an odd number frame.

The signal converting and connecting device 30 is constituted by an SCSI (small computer small interface) data conversion circuit 32, a buffer memory 34, a parallel/serial (P/S) conversion circuit 36, a control circuit (CPU) 38 including a computer, and an identification flag insertion circuit 39.

The SCSI data conversion circuit 32 converts the coded video signals of the SCSI format read from the MO disc 10 to usual coded video signals (video signals based on the SDI format in the present embodiment) and outputs the same to the buffer memory 34. The buffer memory 34 converts the coded video signals X and Y having a time interval for a seek operation on the MO disc 10 to signals of the transmission rate between the signal converting and connecting device 30 and the expansion and decoding device 40 as will be explained later referring to FIG. 5A, multiplexes them, and outputs the result to the P/S conversion circuit 36. The P/S conversion circuit 36 converts the coded video signals stored in the buffer memory 34 to signals of a serial format (video signals of the SDDI format in the present embodiment) and outputs the same to the expansion and decoding device 40.

The control circuit 38 controls the constituent elements of the signal converting and connecting device 30.

The identification flag insertion circuit 39 instructs insertion of an identification flag identifying whether a coded video signal is X or Y to the P/S conversion circuit 36 and the control circuit 38.

The expansion and decoding device 40 is constituted by a serial/parallel (S/P) conversion circuit 42, an identification flag extraction circuit 43, expansion and decoding circuits 44 and 46, a selector circuit 48, a frame memory 50, a serial data interface (SDI) format conversion circuit 52, and a control circuit 54 including a computer.

The S/P conversion circuit 42 converts the coded video signals of a serial format (the video signals of the SDDI format in the present embodiment) input from the P/S conversion circuit 36 of the connection device 30 to signals of a parallel format. The S/P conversion circuit 42 receives the coded video signals X and Y in a mixed state.

The identification flag extraction circuit 43 reads and fetches the mixed coded video signals X and Y which were converted to parallel signals at the S/P conversion circuit 42, detects the identification flags inserted in the signal converting and connecting device 30, identifies whether the coded video signals are X or Y, and outputs flags indicating the result of this (video signal type identification flag) to the control circuit 54.

The two systems of the expansion and decoding circuits 44 and 46 are provided so as to improve the performance of the signal processing. It is also possible if these expansion and decoding circuits 44 and 46 perform the processing in a separate manner with the coded video signals X being processed by the expansion and coding circuit 44 and the coded video signals Y being processed by the expansion and coding circuit 46. In this case, the control circuit 54 performs control based on the video signal type identification flags extracted at the identification flag extraction circuit 43 so that the first expansion and coding circuit 44 is made to operate in the case of the coded video signal X and the results are output from the selector circuit 48 and performs control so that the second expansion and coding circuit 46 is made to operate in the case of the coded video signal y and the results are output from the selector circuit 48. Alternatively, it is also possible if the expansion and decoding circuits 44 and 46 are made to be able to perform the decoding processing for both of the coded video signals X and Y, for example, it is also possible to input signals arriving at the S/P conversion circuit 42 to both of the expansion and decoding circuits 44 and 46, have the corresponding expansion and decoding circuit 44 or 46 execute the processing by referring to the video signal type identification flags supplied to expansion and decoding circuits 44 and 46 from the control circuit 54 and extracted at the identification flag extraction circuit 43, and have the result thereof be output from a selector circuit 48 operating in response to an instruction from the control circuit 54.

Note that, the control operation of the control circuit 54 is carried out by referring to not only the video signal type identification flags, but also the GOP and valid number by which the control circuit 54 indicates the editing position (switching position).

The selector circuit 48 selects either of the video signal X or Y expanded and decoded at the expansion and decoding circuits 44 and 46 under the above control of the control circuit 54 and outputs the result to the frame memory 50.

The frame memory 50 stores the video signals output from the selector circuit 48 in units of frames.

The SDI format conversion circuit 52 places the video signals of the serial digital data interface (SDDI) format stored in the frame memory 50 on an active video (ACV) portion explained later by the SDI format standardized as the standard SMPTE-2 of the SMPTE (Society of Motion Picture and Television Engineering) and outputs the result.

Here, the SDI format and SDDI format will be explained.

SDI Transmission Format

Figure 2A:
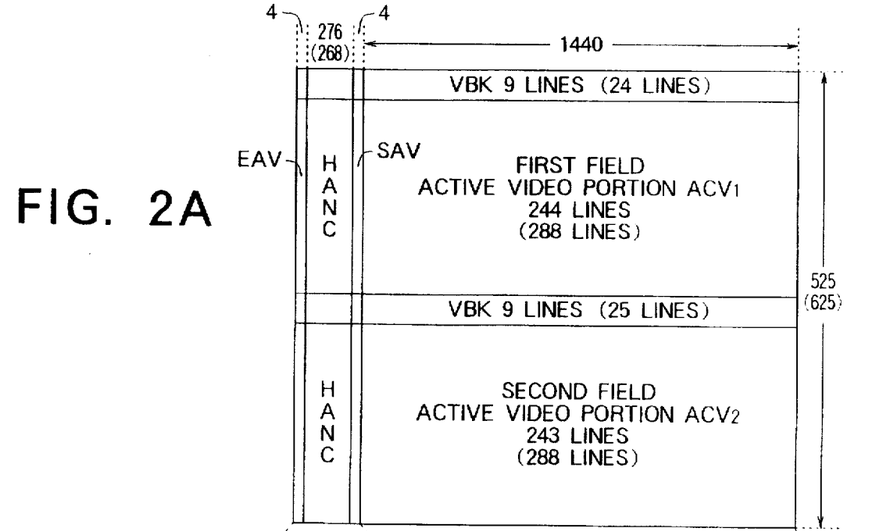
FIG. 2A and FIG. 2B are views illustrating an SDI format as one example of a first transmission format of a video signal of the present invention.
Figure 2B:
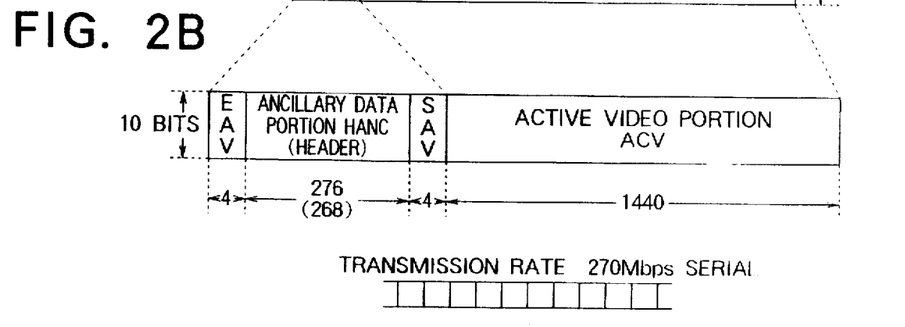

FIG. 2A is a view of the overall configuration of a frame of a video signal of the SDI format; and FIG. 2B is a view of the configuration of a transmission packet of the SDI format.

In the case of a video signal of the NTSC 525 system, a digital video signal of the SDI format is comprised by (4+268+4+1440)=1716 words and 525 lines in the vertical direction with 10 bits/word per line. Further, in the case of the PAL 625 system, a digital video signal of the SDI format is comprised by (4+280+4+1440)=1728 words in the horizontal direction and 625 lines in the vertical direction with 10 bits/word per line. In the figure, numerals in parentheses show the numerical values of the video signals of the PAL 625 system, while numerals not in parentheses show the numerical values of the video signals of the NTSC 525 system. Below, a description will be made only of the case of the NTSC 525 system.

In each line, the four words from the first word to the fourth word are used as a region for storing the code showing the end of the active video portion ACV and for separation from the ancillary data portion ANC explained later, that is, the "end of active video" code EAV. The four-word code EAV is 3FF, 000, 000, XYZ (any data) by hexadecimal notation.

In each line, in the case of the NTSC 525 system, the 268 words from the fifth word to 272-nd word are used as a horizontal directional ancillary data portion ANC and store the header, auxiliary data, the audio data, etc.

In each line, in the case of the NTSC 525 system, the four words from the 273-rd word to the 276-th word store a code showing the start of the active video portion ACV and for separation from the ancillary data portion ANC, that is, the start of active video code SAV. The four-word code SAV is 3FF, 000, 000, XYZ (any data) indicated by hexadecimal notation. That is, EAV and SAV are data having same first three words.

In both of the case of the NTSC 525 system and the case of the PAL 625 system, the same number, i.e., 1440 words of the active video portion ACV (active video) are provided in the horizontal direction and the video signals stored. The 525 lines (in the case of the NTSC 525 system) are roughly divided into two regions. That is, in the case of the NTSC 525 system, the 10-th line to 263-rd line (10+244=254 lines) are used as a first field of an active video portion $ACV_1$ and the 273-rd line to 525-th line (10+243=253 lines) are used as a second field of an active video portion $ACV_2$.

The signals of the SDI format are converted to serial transmission signals of 170 Mbps and transferred with apparatuses such as editing apparatuses etc.

The standard SMPTE-259 is basically a signal standard aimed at the D1 format or D2 format which are standards of digital signals. Accordingly, signals of the SDI format are used for transmission as the digital AV signals of the D1 format or the D2 format. The transmission rate (transmission frequency) of signals of the SDI format is high, i.e., 270 MHz. However, due to the standardization, in signals of the SDI format, the amount of signals which can be transmitted is limited only to the amount of one channel of the digital video signals, and further limited only to the amount of 8 channels of the voice signal of the base band. Accordingly, when the SDI format is used, the limit of transmission is sometimes met.

SDDI Format

Therefore, the assignee of the present application has proposed a new digital data format which not only makes use of the advantages of the SDI format, maintains partial compatibility with the SDI format, and is preferable for multimedia or multi-channel applications, but also is suitable for data communication systems such as local area networks (LAN), Ether Nets, and Token Rings (for example, refer to Japanese Patent Application No. 6-144,403 "Digital Signal Transmission Method, Digital Signal Transmitting Apparatus and Receiving Apparatus, and Transmitting and Receiving Apparatus" filed on Jun. 27, 1994). The new format proposed by the present assignee will be referred to as the "serial digital data interface (SDDI) format".

Figure 3A:
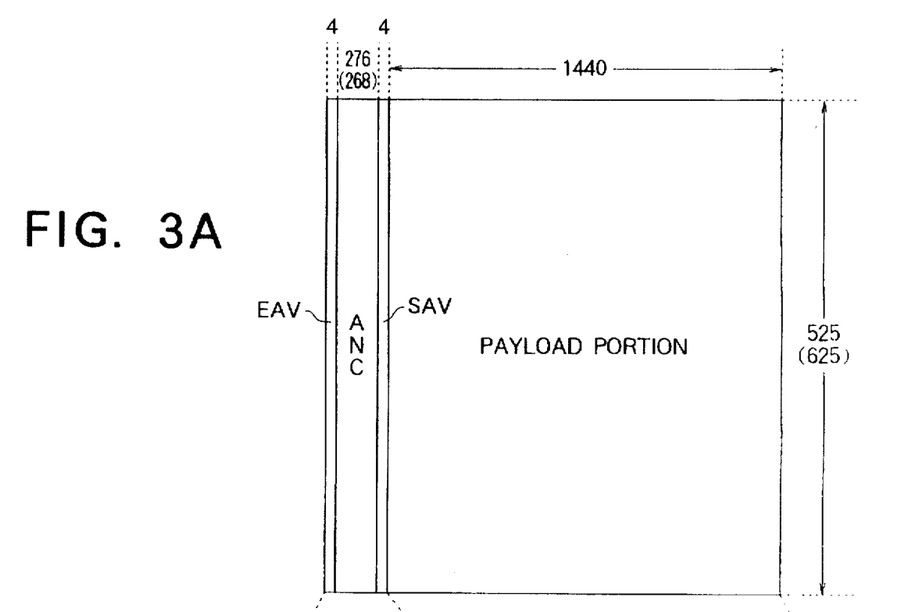
FIG. 3A and FIG. 3B are views illustrating an SDDI format as one example of a second transmission format of a video signal of the present invention.
Figure 3B:
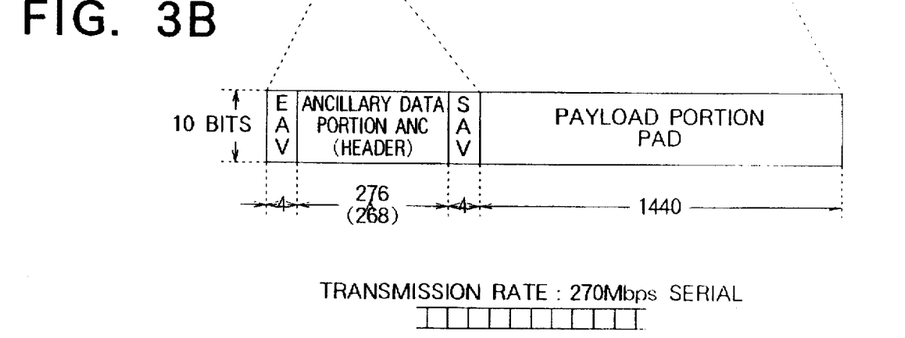
Figure 4A:
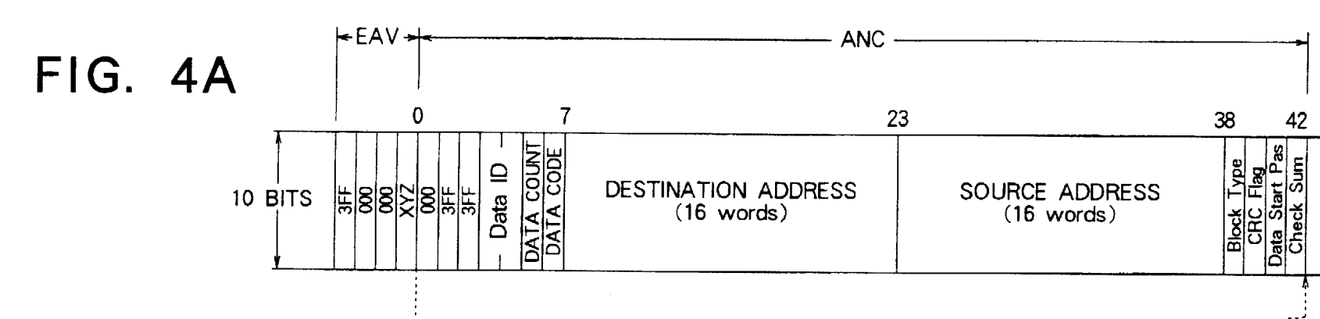
FIG. 4A and FIG. 4B are views of a detailed configuration of an ancillary portion of the SDDI format shown in FIG. 3A and FIG. 3B.
Figure 4B:
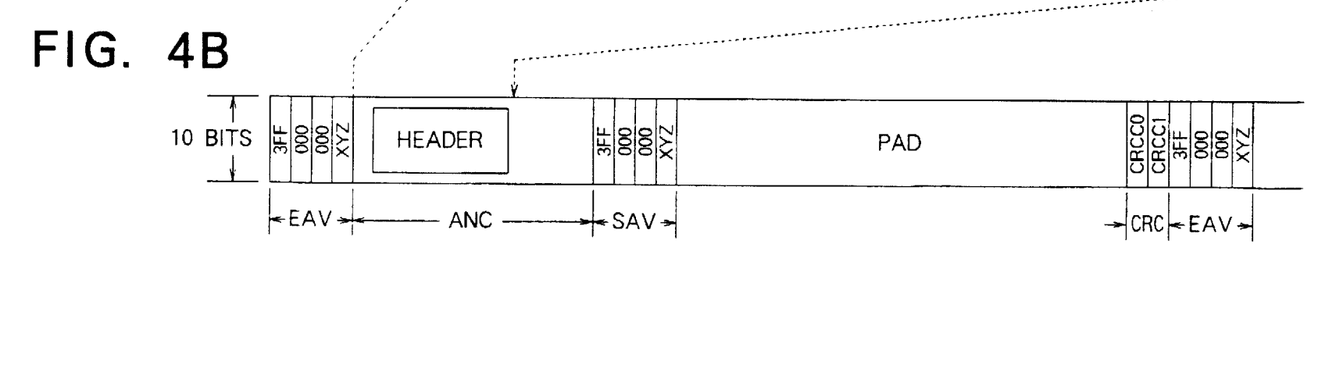

FIG. 3A is a view of the SDDI format; while FIG. 3B is a view of the configuration of a transmission packet of the SDDI format illustrated in FIG. 2A. FIG. 4A is a view of the data contained in the ancillary data portion ANC of the transmission packet of the SDDI format shown in FIG. 3B, particularly the configuration of the header; and FIG. 4B is a view of the position occupied by the header data shown in FIG. 4A in the ancillary data portion ANC and the relationship before and after this.

In the case of a video signal of the NTSC 525 system, the digital video signal of the SDDI format is comprised by (4+268+4+1440)=1716 words in the horizontal direction and 525 lines in the vertical direction with 10 bits/word per line. Further, in the case of a video signal of the PAL 625 system, the digital video signal of the SDDI format is comprised by (4+280+4+1440)=1728 words in the horizontal direction and 625 lines in the vertical direction with 10 bits/word per line. In the figures, numerals in parentheses show the numerical values of video signals of the PAL 625 system, and numerals not in parentheses show the numerical values of video signals of the NTSC 525 system. Below, the explanation will be made only of the case of the NTSC 525 system.

In each line, the four words from the first word to the fourth word are used as a region for storing the EAV (end of active video) code showing the end of a payload portion PAD (portion corresponding to the active video portion ACV of an SDI signal) and for separation from the ancillary data portion ANC explained later.

In each line, in the case of the NTSC 525 system, the 268 words from the fifth word to 272-nd word are used as the ancillary data portion ANC and store the header, auxiliary data, etc.

In each line, in the case of the NTSC 525 system, the four words from the 273-rd word to the 276-th word store an SAV (start of active video) code showing the start of the payload portion PAD (active video portion ACV) and for separation from the ancillary data portion ANC.

The capacity in the case of the NTSC 525 system and the capacity in the case of the PAL 625 system are the same. A payload portion PAD of 1440 words is provided in the horizontal direction, where the video signals and the audio signals are stored. In the SDI format, audio signals were stored only in the ancillary data portion ANC, but in the SDDI format, not only the video signals, but also the audio signals can be stored in the payload portion PAD. Note that, in the present invention, as will be explained later, to prevent disturbances of the video signals at the editing positions (switching positions), "flaps" are added to the video signals and information accurately indicating the switching position, the number of GOPs, the valid number, the type X or Y of the video signals are used or these information are set in the Video Control Command (not illustrated) of the payload portion PAD of the SDDI format so that the GOP of the destination of switching can be understood.

The end of active video code EAV is comprised by 3FF, 000, 000, XYZ with the first three words the same as those of the EAV of the SDI signal. The ancillary data portion ANC unique to the SDDI format continues after the EAV. The header data is positioned at the top of the ancillary data portion ANC of a transmission packet of the SDDI format.

Common Features of SDI Format and SDDI Format

The length of the data of the lines, the frame configuration, and the data transmission rate of the SDI format and the SDDI format are made the same. Further, compatibility is imparted to the transmission packet of the SDI format and the transmission packet of the SDDI format.

Each line of a video signal of the SDDI format is comprised by same number of words (10 bits/word and 1724 (1716) words) per line in the horizontal direction and the same number of lines (525 (626) lines) in the vertical direction similar to each line of a video signal of the SDI format and contains the separation codes SAV and EAV, the ancillary data portion ANC, and payload portion PAD (data portion DT) corresponding to the codes SAV and EAV, ancillary data portion ANC, and active video portions $ACV_1$ and $ACV_2$ of the SDI format.

Both of the signal of the SDI format and the signal of the SDDI format are converted to transmission signals of a serial format of 270 Mbps for transmission or reception. Accordingly, signal processing can be carried out at the same speed.

Differences Between SDI Format and SDDI Format

In the SDI format, the audio signals are stored in the ancillary data portion ANC, but in the SDDI format, unlike the SDI format, the audio signals are not contained in the ancillary data portion ANC data. Rather, the audio signals and the video signals are stored in the payload portion.

The frame of the signal of the SDDI format does not contain a portion corresponding to the vertical blanking portion VBK of the SDI video signal.

In the present embodiment, the data is read from the MO disc 10 by the SDI format, output from the P/S conversion circuit 36 as the SDDI format, processed by the SDDI format in the expansion and decoding circuit 40, converted to a signal of the SDI format at the SDI conversion circuit 52, and output to the outside.

Below, the operation of the video signal editing apparatus 1 will be explained using a case where a coded video signal Y is inserted into a coded video signal X as a concrete example referring to FIG. 5A to FIG. 5D to FIG. 9A, FIG. 9B, and FIG. 10 and FIG. 11.

Figure 5A:
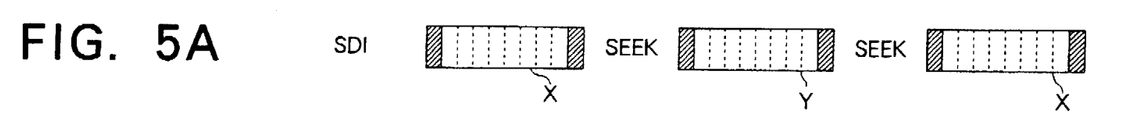
FIG. 5A shows a timing at which two types of coded video signals X and Y of an SCSI format are output from a magneto-optical disc drive.
Figures 5B, 5C:
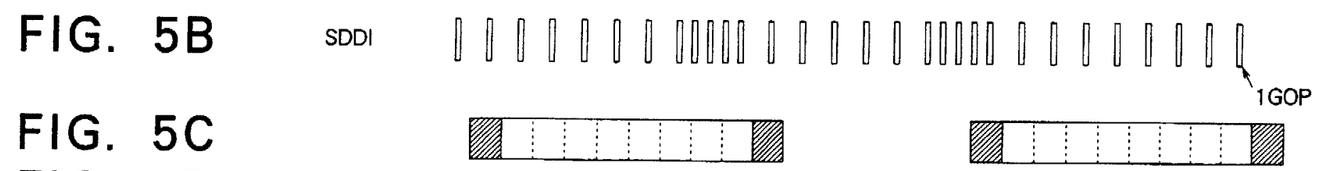
FIG. 5B shows a timing at which a GOP of the coded video signal is output from the connection device.
FIG. 5C and FIG. 5D are views of a timing at which the coded video signals X and Y are decoded in two decoding circuits, respectively.

FIG. 5A to FIG. 5D are views of the signal format explaining the operation of the video signal editing apparatus 1 shown in FIG. 1, in which FIG. 5A shows the timing at which the coded video signals X and Y of the SCSI format are alternately output from the MO disc drive 20; FIG. 5B shows a timing at which a GOP indicating the editing position (switching position) of the video signals X and Y is output from the signal converting and connecting device 30; and FIG. 5C and FIG. 5D respectively show timings at which the coded video signals X and Y are decoded at the expansion and decoding circuits 44 andFIGS 46.

FIG. 6A, FIG. 6B, and FIG. 6C to FIG. 9A and FIG. 9B show the relationships between the editing position and the frames of the coded video signals X and Y and the coded video signal transmitted from the signal converting and connecting device 30 shown in FIG. 1, respectively. FIG. 6A, FIG. 7A, FIG. 8A, and FIG. 9A show the relationships between the editing position and the frames of the coded video signals X and Y; and FIG. 6B, FIG. 7B, FIG. 8B, and FIG. 9B show the format of the coded video signals transmitted from the signal converting and connecting device 30.

The MO disc drive 20 reads the coded video signals X and Y at the timings shown in FIG. 5A in the order and with the time length designated from the MO disc 10 via the terminal apparatus 60 and outputs the same to the signal converting and connecting device 30. An interval corresponding to exactly the time required for a seek operation on the MO disc 10 is generated between the coded video signals X and Y read from the MO disc drive 20.

The coded video signals read from the MO disc 10 are input to a buffer memory 34 via the SCSI data conversion circuit 32. The buffer memory 34 converts the speeds of the coded video signals, multiplexes them, and outputs the result to the P/S conversion circuit 36. The P/S conversion circuit 36 converts the coded video signals to video signals of the serial format and transmits the same to the expansion and decoding device 40.

The S/P conversion circuit 42 in the expansion and decoding device 40 converts the coded video signals of the SDDI format transmitted from the P/S conversion circuit 36 in the signal converting and connecting device 30 to video signals of the parallel format. Here, the coded video signals X and Y output from the S/P conversion circuit 42 to the expansion and decoding circuits 44 and 46 are transmitted from the signal converting and connecting device 30 so that parts overlap as indicated by the hatched portions of FIG. 5C and FIG. 5D so that each of the coded video signals X and Y can be completely decoded.

Figure 5D:
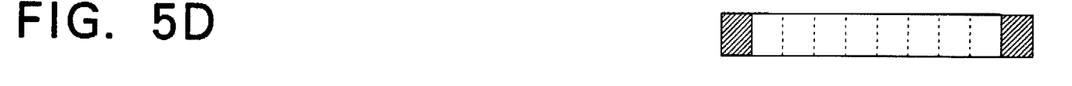

The portions of overlap of these coded video signals X and Y are referred to here as the "flaps" (overlapping portions)" in the present specification. The idea of the present invention is to add the "flaps" to prevent the disturbances of the video signal at the editing positions.

However, the number of the GOPs of a coded video signals of the serial format output from the P/S conversion circuit 36 (that is, the video signals of the SDDI format) is increased by the amount of the "flaps" as shown in FIG. 5B. Accordingly, so as to accurately determine the editing positions (switching positions), the number of the GOPs, valid number, and type of X or Y of the video signals become necessary. This information indicating the editing positions (switching positions) is set in the Video Control Command (not illustrated) of the payload portion PAD of the SDDI format so as to enable determination of the GOPs of the switching destination.

The expansion and decoding circuit 44 expands and decodes the coded video signal X input from the S/P conversion circuit 42. That is, in the expansion and decoding circuit 44, the value of the identification flag of the coded video signal X which should be expanded and decoded by itself, extracted at the identification flag extraction circuit 43 and input to the expansion and decoding circuit 44 via the control circuit 54, is set. Only when the identification flag of each of the frames of the input coded video signal coincides with a set value does it expand and decode the video data of each frame of the coded video signal to generate the original video signal X or Y and notify the coincidence of the identification flag to the control circuit 54.

The expansion and decoding circuit 46 performs a similar operation to that of the expansion and decoding circuit 44 for the coded video signal Y or X, generates the original video signal Y or X from the coded video signal Y, and notifies the coincidence of the identification flag to the control circuit 54.

The selector circuit 48 selects either of the video signal X or Y generated by the expansion and decoding circuits 44 and 46 under the control of the control circuit 54 and outputs the same to the frame memory 50. That is, where either of the expansion and decoding circuit 44 or 46 indicates the coincidence of the identification flag, it outputs the video signal where the identification flag coincides.

Further, where both of the expansion and decoding circuits 44 and 46 indicate the coincidence of the identification flag, it outputs the video signal first output from either of the expansion and decoding circuit 44 or 46 until the video signal is ended and outputs the other video signal after that video signal is ended.

The frame memory 50 stores the video signals input from the selector circuit 48 in units of frames. The SDI conversion circuit 52 outputs the video signals stored in the frame memory 50 as the video signals of the SDI format.

Combination of Frames with Respect to Editing Positions

Figure 8A:
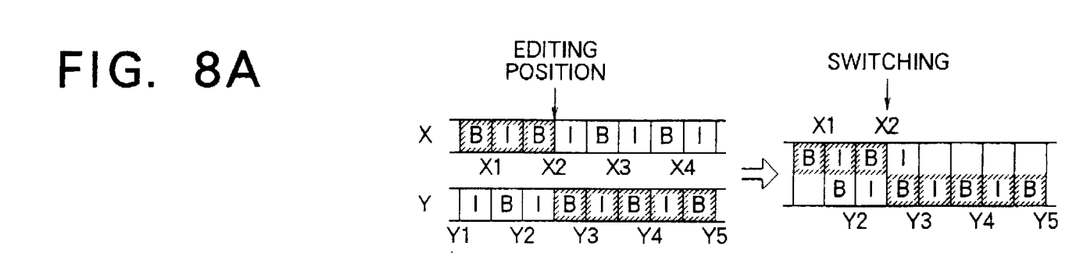
FIG. 8A is a view of the relationship between the editing position and the frames of the coded video signals X and Y.
Figure 9A:
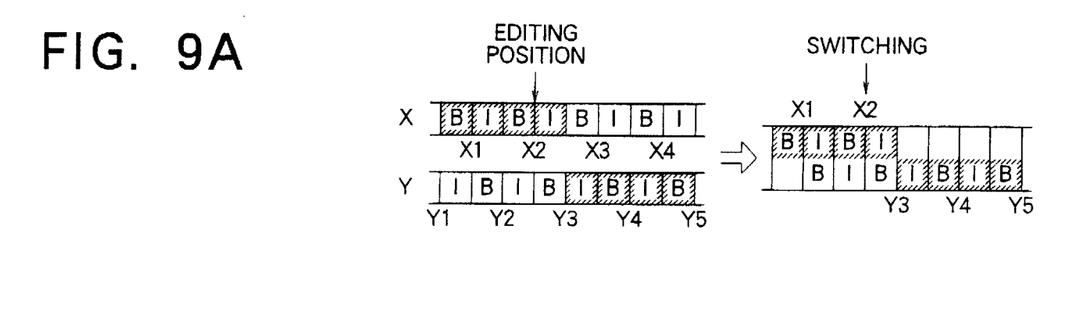
FIG. 9A is a view of the relationship between the editing position and the frames of the coded video signals X and Y.
Figure 9B:
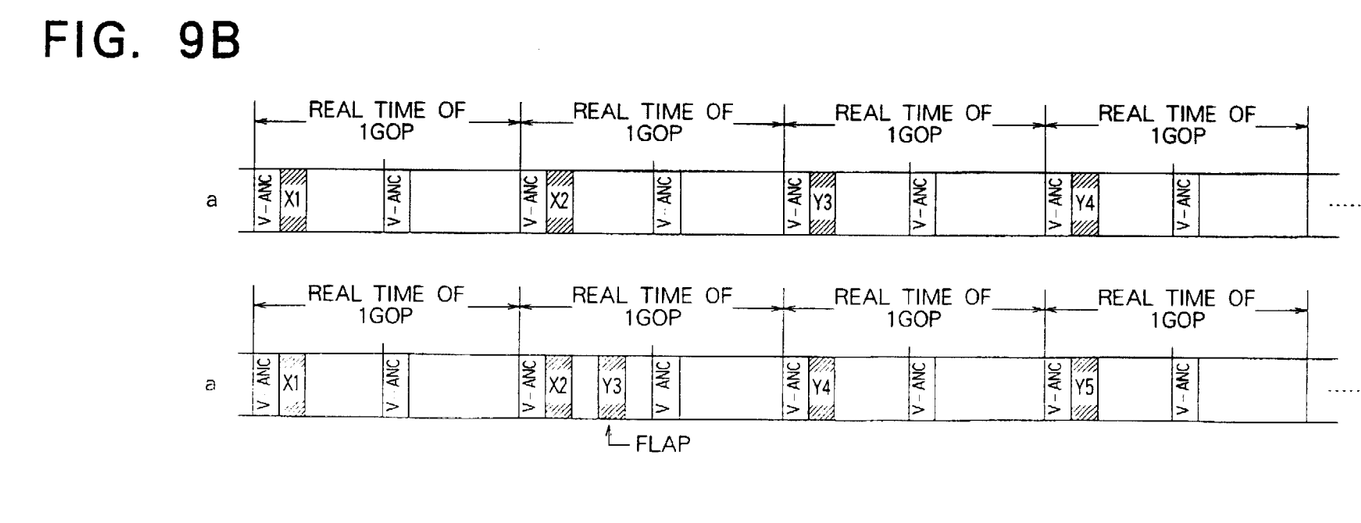
FIG. 9B is a view of the content of a coded video signal output from the connection device.
Figure 10:
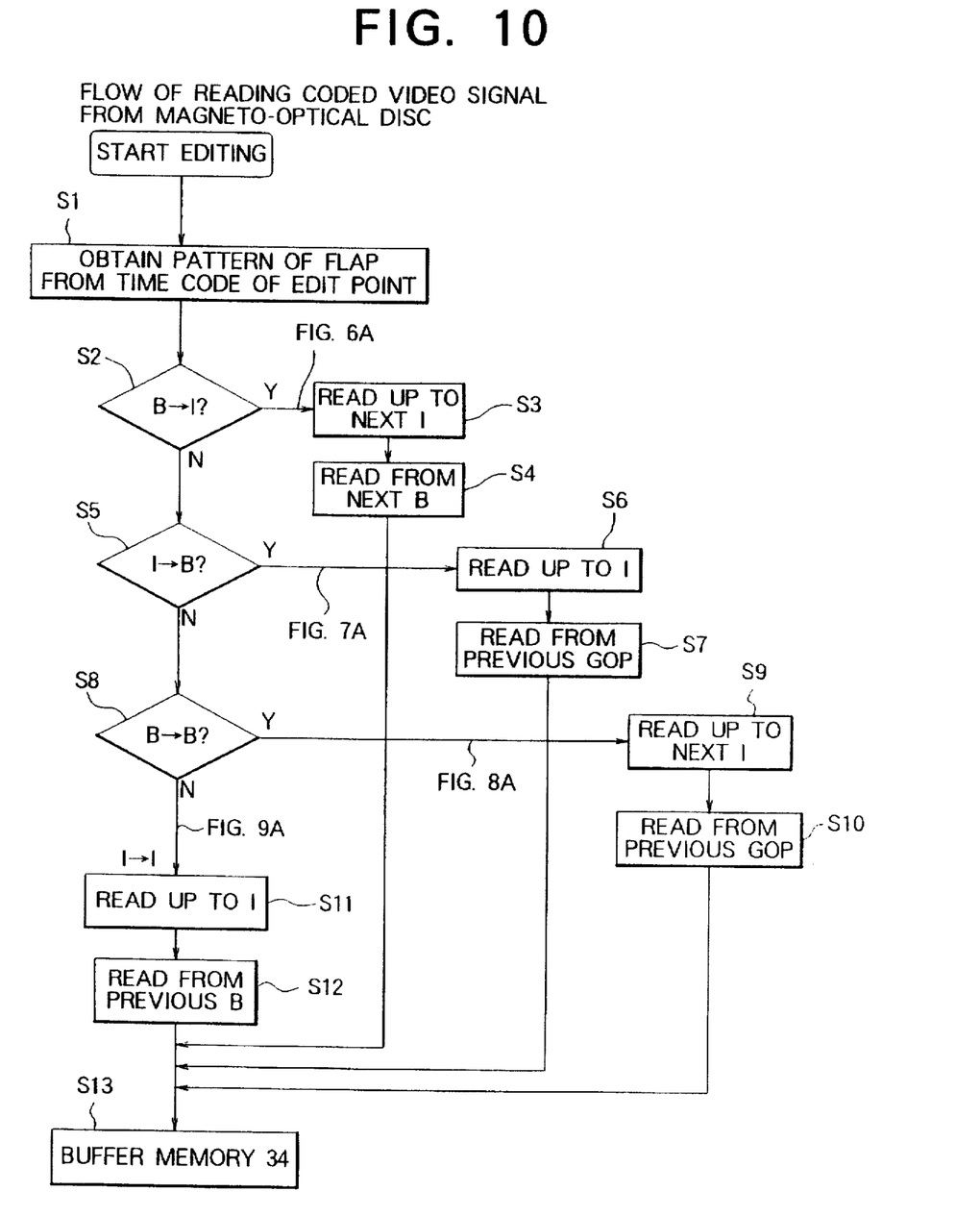
FIG. 10 and FIG. 11 are flow charts of the signal processing for editing shown in FIG. 6 to FIG. 9.

There are four combination of the frames with respect to the editing positions: a case where the coded video signals X and Y become the video signal of the B-frames and the video signal of the I-frames, respectively (FIG. 6A); a case where they become the I-frames and B-frees (FIG. 7A); a case where the two become the B-frames (FIG. 8A); and a case where the two become the I-frames (FIG. 9A). FIG. 10 is a flow chart illustrating this.

Below, an explanation will be made of the method of reading the coded video signals from the MO disc 10 by the MO disc drive 20 and transmitting the same from the signal converting and connecting device 30 for every combination of the frames with respect to the editing positions.

FIG. 10, Steps 2 to 4

Figure 6A:
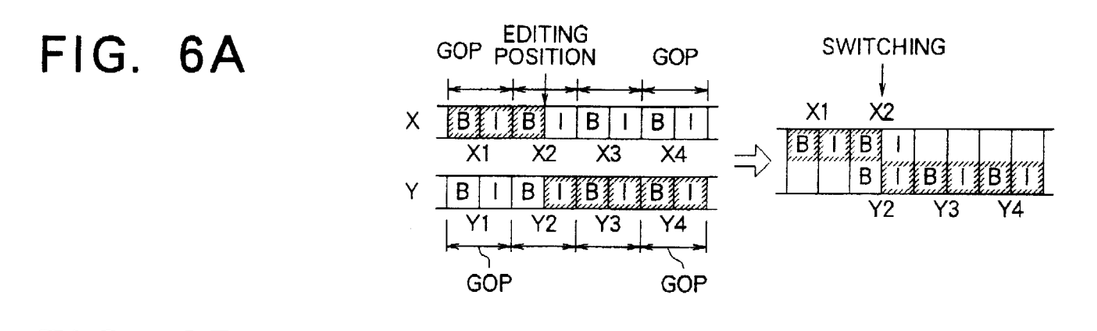
FIG. 6A is a view of the relationship between the editing position and the frames of the coded video signals X and Y.
Figure 6B:
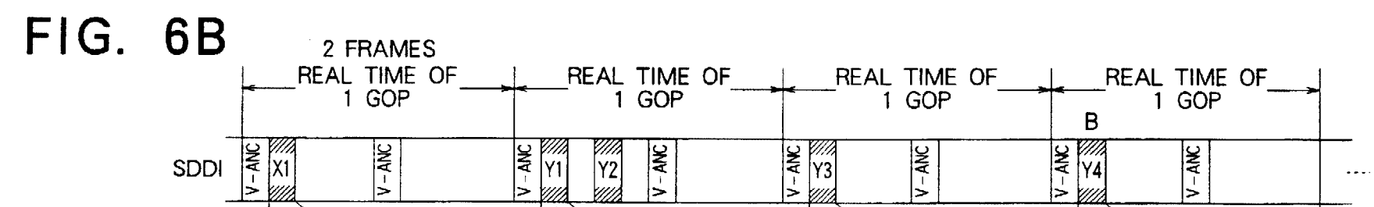
FIG. 6B is a view of the content of the coded video signal of the SDDI format output from the connection device.

As shown in FIG. 6A, where the coded video signals X and Y become the B-frame video signal and the I-frame video signal, respectively, if they are read (divided) as they are, the coded video signal Y can be completely expanded and decoded, but the coded video signal X cannot be completely expanded and decoded. In such a case, the MO disc drive 20 reads out from the MO disc 10 the B-frame video signal of the coded signal X2 shown in FIG. 6A adding to it the I-frame video signal of the next coded signal X2. As a result, as shown in FIG. 6B, the signal converting and connecting device 30 outputs only the coded video signal X (X1) for the GOPs before the portion of the "flap". At the editing position, the coded video signal X2 and the coded video signal Y2 are output for the GOPs corresponding to the "flap", and the coded video signals Y (Y3, Y4, . . . ) are output for the GOPs after the "flap".

Figure 6C:
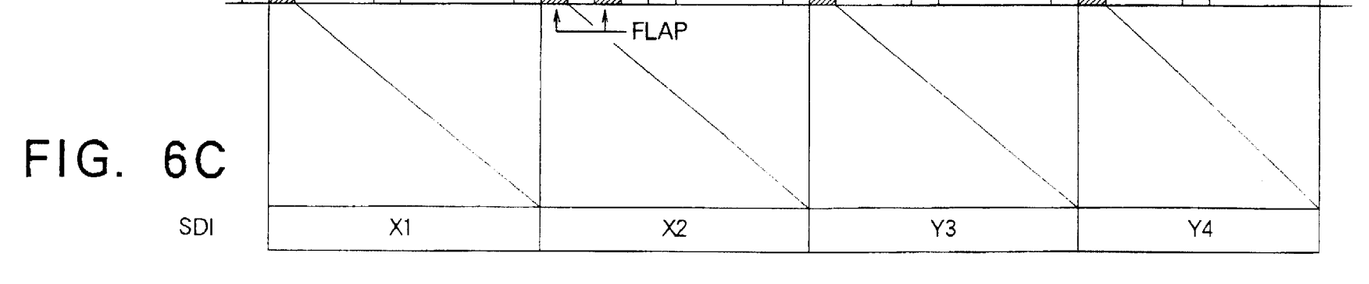
FIG. 6C is a view converting the signal of the SDDI format shown in FIG. 6B to the signal of the SDI format.

Note that, the "flap" is attached to the SDDI format as shown in FIG. 6B. FIG. 6C illustrates a coded signal of the SDI format obtained by expanding and decoding the signal of the SDDI format shown in FIG. 6B at the expansion and decoding circuits 44 and 46.

The information indicating the switching position, that is, the number of GOPs, valid number, and types X and Y of the video signal are set in the Video Control Command (not illustrated) of the payload portion PAD of the SDDI format so as to enable determination of the GOPs of the destination of switching as mentioned before. Accordingly, the control device 54 performs the switching control referring to this information.

FIG. 10, Steps 5 to 7

Figure 7A:
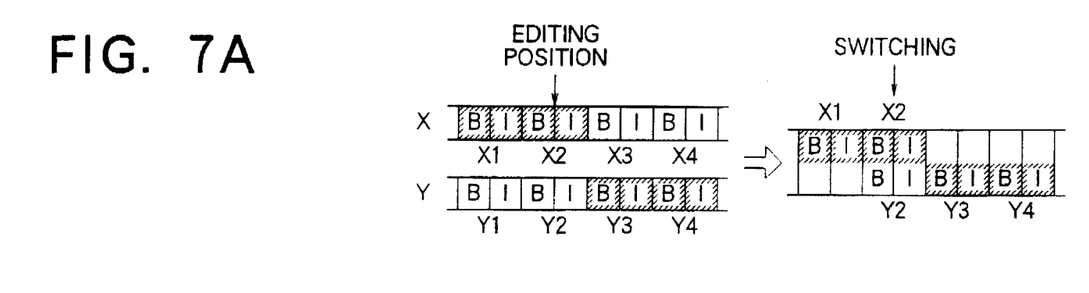
FIG. 7A is a view of the relationship between the editing position and the frames of the coded video signals X and Y.
Figure 7B:
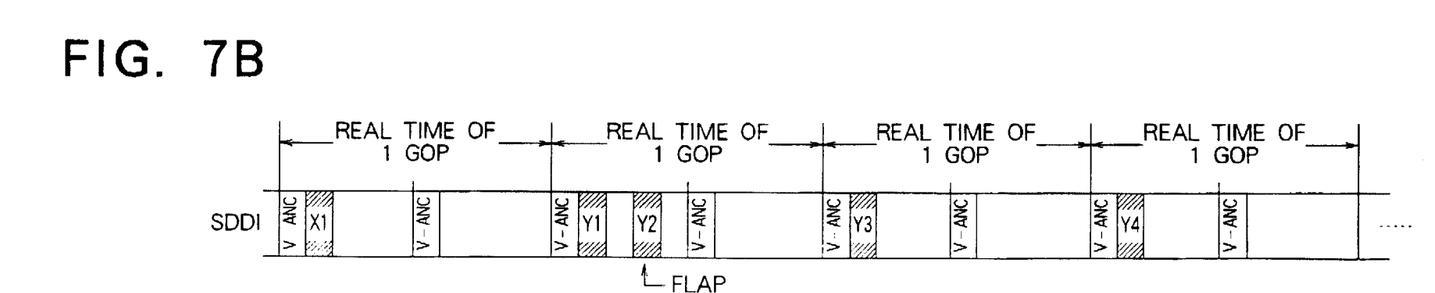
FIG. 7B is a view of the content of a coded video signal output from the connection device.

As shown in FIG. 7A, where the coded video signals X and Y are the I-frame video signal and the B-frame video signal, respectively, if they are read (divided) as they are, the coded video signal X can be completely expanded and decoded, but the coded video signal Y cannot be completely expanded and decoded. In such a case, the MO disc drive 20 reads the coded video signal Y from the coded video signal Y2 of one GOP preceding the editing position. As a result, as shown in FIG. 7B, a similar coded video signal to that shown in FIG. 6B is output from the signal converting and connecting device 30.

FIG. 10, Steps 8 to 10

As shown in FIG. 8A, where both of the coded video signals X and Y are the B-free video signals, if they are read as they are, both of the coded video signals X and Y no longer can be completely expanded and decoded. In such a case, the MO disc drive 20 reads the coded video signal X adding to it the I-frame video signal of the coded video signal X2 and reads the coded video signal Y from the one coded video signal Y2 preceding the editing position as indicated by the signals a and b of FIG. 8B, respectively. These signals are output from the signal converting and connecting device 30 at either timing of the signal a or b of FIG. 5B. Both of the coded video signals X and Y can be completely expanded and decoded by any of these methods, so the method suited to the actual configuration of the video signal editing apparatus 1 can be adopted.

Figure 8B:
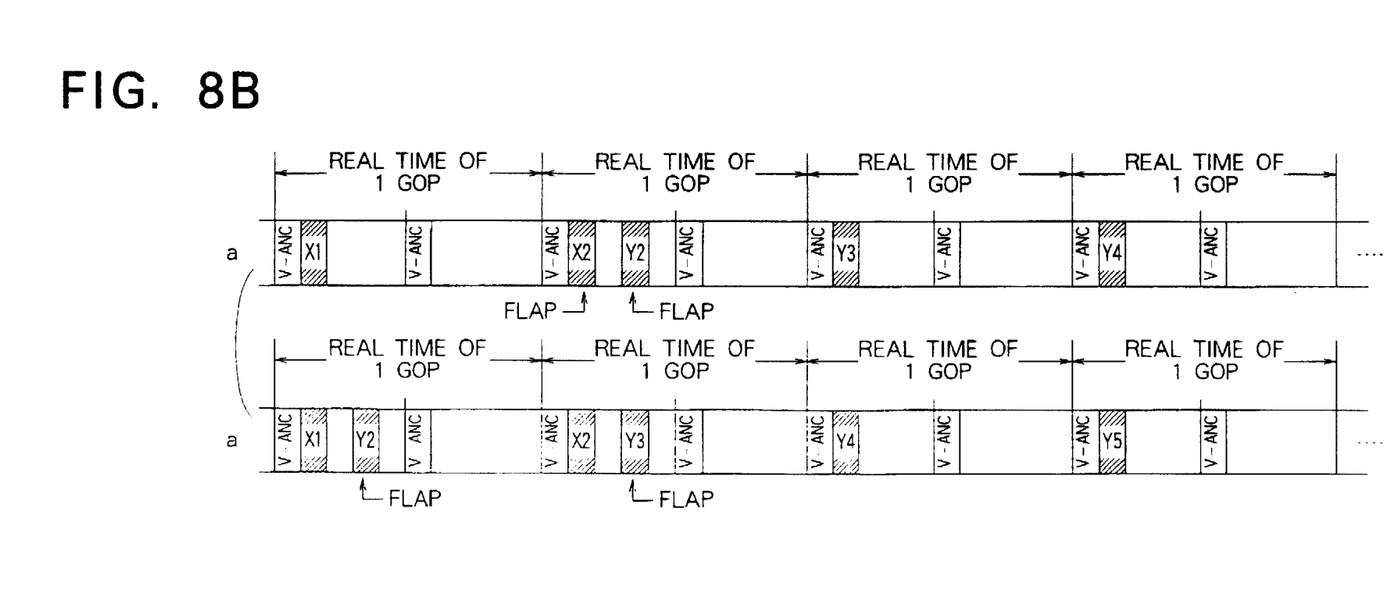
FIG. 8B is a view of the content of a coded video signal output from the connection device.

When comparing a and b of FIG. 8B, b has a preceding position of the "flap". This means that there is a sufficient margin of time in the processing of the expansion and decoding circuits 44 and 46, which is convenient.

FIG. 10, Steps 8, 11, and 12

As shown in FIG. 9A, when both of the coded video signals X and Y are I-frame video signals, both of the coded video signals X and Y can be completely expanded and decoded even if they are read as they are. In such a case, as indicated by the signals a and b of FIG. 9B, a method in which the MO disc drive 20 reads the coded video signal X up to the coded video signal X2 and reads the coded video signal Y from the editing position or from one editing position before can be considered.

Similar to the case shown in FIG. 8B, both of the coded video signals X and Y can be completely expanded and decoded by any of these methods, so the method suited to the actual configuration of the video signal editing apparatus 1 can be adopted.

According to the video signal editing apparatus 1 shown in the first embodiment, by reading the plurality of coded video signals from the MO disc 10 by the MO disc drive 20 so as to add predetermined frames respectively determined by the relationship between the editing position and the frames of the coded video signal and multiplexing the same by the signal converting and connecting device 30, the signals can be easily connected and edited and, in addition, no disturbance occurs in the video signal obtained as a result of editing.

Further, as shown in FIG. 8, the degree of freedom of the selection of frames to be added due to the relationship between the editing position and the frames of the coded video signal is high, so the design of the video signal editing apparatus 1 is easy.

In the first embodiment, the video signal editing apparatus 1 was configured so as to add a frame for completely expanding and decoding the coded video signal when reading a coded video signal from the MO disc 10 by the MO disc drive 20, but it is also possible to configure it so that, for example, after the coded video signal is read from the MO disc 10, the coded video signal is once stored in the memory, the frame which should be added is determined, and that frame is added. In this way, even if the video signal editing apparatus 1 is configured so that the predetermined frame is added after the coded video signal is once stored in the memory or, as shown in the first embodiment, even if it is constituted so that the predetermined frame is added when recording the coded video signal by the MO disc drive 20, these configurations are equivalent in terms of dividing the coded video signal.

Further, the method used when reading the coded video signals from the MO disc 10 shown in FIG. 6 to FIG. 9 was an example. It is also possible to set the rules so that for example the portions acting as the "flaps" become wider.

Furthermore, the format of the signal output from the expansion and decoding device 40 is not limited to the SDI format and can be other signal formats too.

Figure 11:
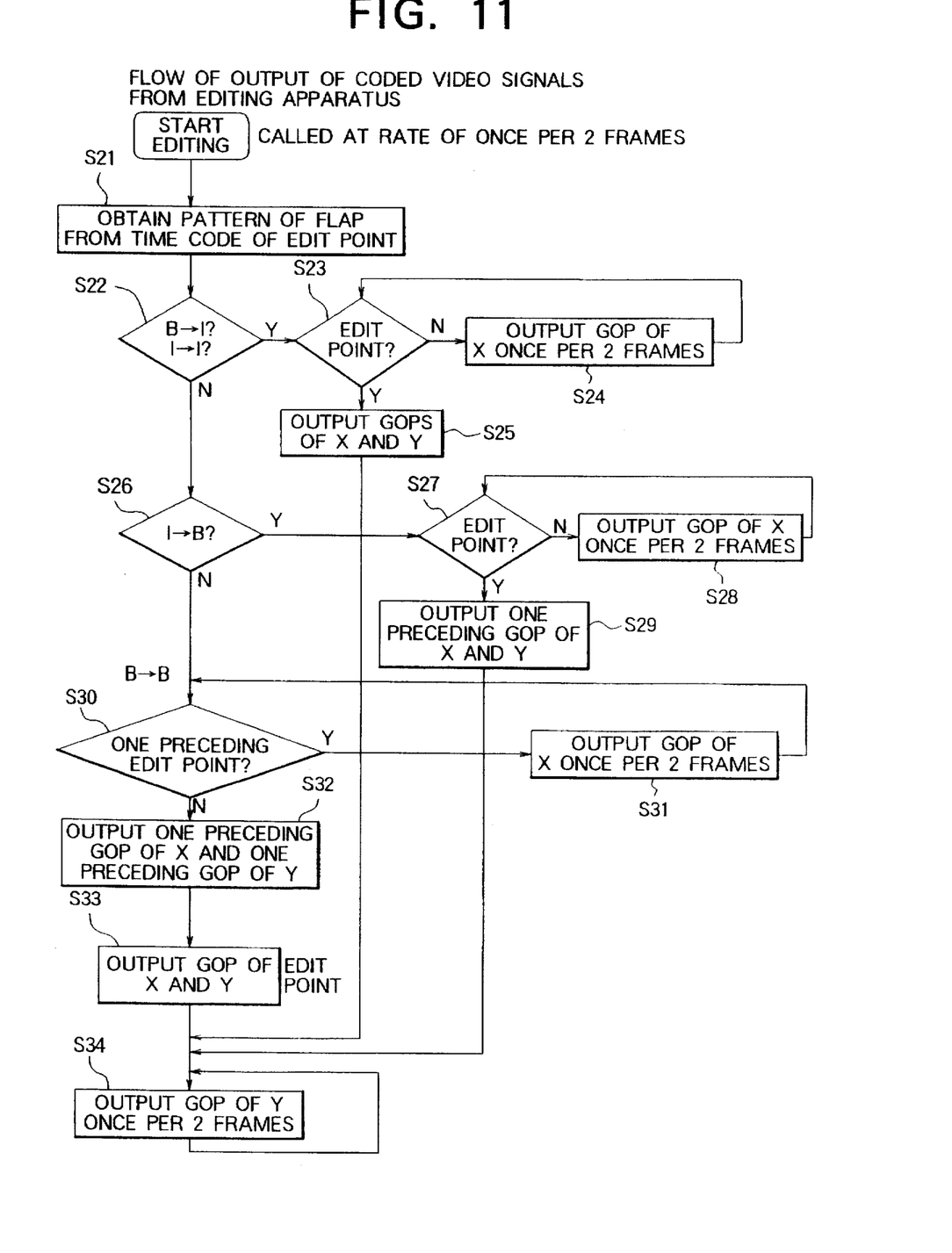

As described above, the signal read from the MO disc drive 20 for being given the "flap" is recorded at the signal converting and connecting device 30 (editing device) according to the processing of the flow chart shown in FIG. 11.

Second Embodiment

Below, as a second embodiment of the video signal editing apparatus of the present invention, the rule of reading the coded video signal from the MO disc 10 when using the MO disc 10 adopting a configuration of the GOPs different from that shown in the first embodiment will be explained.

In the second embodiment, the MO disc 10 records GOPs of four frames, that is, a first B-frame, an I-frame, a second B-frame, and the pre-direction prediction frame (P-frame) requiring the video data of the previous I-frame when expanding and decoding the video data of the frames, arranged in that order.

Below, an explanation will be made of a case where the coded video signal is read in units of GOPs from such an MO disc 10.

Where the editing position corresponds to the head of the coded video signal, the signal is read from the head of the one preceding GOP when the previous frame of that coded video signal is the first B-frame and the signal is read from the head of the same GOP in other cases. When the editing position corresponds to the end of the coded video signal, the signal may be read up to the P-frame of the same GOP.

An explanation will be made next of the rule when the editing position is the head of the coded video signal.

Where the editing position corresponds to the first B-frame in such a case, to expand and decode the B-frame, the previous P-frame is required, so the data is read from the head of the one preceding GOP.

Where the editing position corresponds to the I-frame, the frames before or after the current frame which are necessary at the expansion and decoding are not required, so the data is read from the head of the same GOP.

Where the editing position corresponds to the second B-frame, the I-frame and P-frame before and after the current frame which are necessary at the expansion and decoding exist in the same GOP, so the signal is read from the head of the same GOP.

Where the editing position corresponds to the P-frame, the I-frame, which is necessary at the expansion and decoding exists in the same GOP, so the data is read from the head of the same GOP.

Next, an explanation will be made of a rule in a case where the editing position becomes the last of the coded video signal.

In this case, the last frame in the GOP is the P-frame, and the next GOP is not required at the expansion and decoding no matter what frame the editing position corresponds to, so the signal may be read up to the P-frame of the same GOP in all cases.

Where the editing position corresponds to the second B-frame, the signal is read up to the I-frame of another GOP subsequent to this or up to the P-frame of the same GOP or other GOP before this.

Where the editing position corresponds to the P-frame, no frame is added and the signal is read up to the I-frame of the same GOP or another GOP subsequent to this or up to the P-frame of another GOP subsequent to this.

By making the MO disc drive 20 read the coded video signals from the MO disc 10 according to the above rule, the coded video signals after connection can be completely expanded and decoded.

Note that, as shown in FIG. 5 etc., the length of the "flap" may be determined in accordance with the actual configuration of the video signal editing apparatus 1.

The rule for reading the coded video signals from the MO disc 10 described above is common to cases where a signal is read from an MO disc 10 having a configuration of GOPs in which one or more B-frames, one I-frame, and one or more P frames are arranged, in any order.

Accordingly, so far as the above rule is used, according to the video signal editing apparatus of the present invention, so long as the GOP configuration satisfies the condition that one or more B-frames, one I-frame, and one or more P frames are arranged, in any order, it is possible to perform the connection and editing of any type of coded video signals.

Further, it is also possible to constitute for example the expansion and decoding circuit 44 for use for a coded video signal having the configuration of the GOPs shown in the second embodiment, constitute the expansion and decoding circuit 46 for use for a coded video signal having the configuration of the GOPs shown in the first embodiment, and use the video signal editing apparatus 1 as an apparatus for connecting coded video signals having different GOP configurations.

The video signal editing apparatus of the present invention can adopt various configurations as shown in the modifications mentioned here in addition to those shown in the embodiments. For example, it is also possible to use a hard disk in place of the MO disc 10 and use a hard disk drive in place of the MO disc drive 20.

As mentioned above, according to the video signal editing apparatus of the present invention, video signals compressed and coded by inter-frame coding can be connected and edited.

In addition, even if the video signal obtained as a result of editing is expanded and decoded, no disturbance is generated in the image.

Industrial Applicability

The video signal editing apparatus of the present invention can be used for the editing of video signals in a broadcasting station etc.

We claim:

1. A video signal editing apparatus for connecting a plurality of coded video signals,
   each of the coded video signals being divided into groups each including a plurality of frames containing at least one intra-frame; the intra-frames being coded so that original video data can be decoded from only the video data contained in those frames; and the video data of the frames other than the intra-frames of the groups requiring the video data of other frames when decoded to the original video data;
   said video signal editing apparatus comprising:
   a signal processing means for dividing each of the plurality of coded video signals at a timing of connection of the coded video signals so that the boundaries of the groups become ends of the coded video signals and
   a video signal superimposing means for superimposing the coded video signals divided by the signal processing means on each other to connect the same.

2. A video signal editing apparatus as set forth in claim 1, wherein
   said group contains alternate intra-frames and bi-directional frames and the video data of said bi-directional frames require the video data of the two adjoining intra-frames when decoding it to the original video data and
   said signal processing means divides each of said plurality of coded video signals so that said intra-frames are at the rear end.

3. A video signal editing apparatus as set forth in claim 1, wherein said group contains an intra-frame, pre-direction prediction frame, and hi-directional frame, the video data of said bi-directional frame requires the video data of the two adjoining frames when decoding to the original video data, and the video data of the pre-direction prediction frame requires the video data of the frame before it when decoding to the original video data and
   said signal processing means divides each of said plurality of coded video signals at a timing of connecting the coded video signals so that the boundaries of said groups become the ends.

4. A video signal editing apparatus as set forth in claim 1, wherein provision is further made of
   a decoding means for decoding each of the video data of said connected plurality of coded video signals to the video data of the original video signals and
   a switching means for switching and outputting each of said original video signals decoded by said decoding means at said connection timings.

5. A video signal editing apparatus wherein:
   where connecting coded video signals in each of which a B-frame and an I-frame constitute a GOP in that order,
   if the B-frame comes at the end of a coded video signal, the signal is divided adding up to the I-frame of the same or succeeding GOP while if the B-frame comes at the start of a coded video signal, the signal is divided adding up to the B-frame or I-frame of the same or previous GOP, and
   these coded video signals are superimposed and connected.

* * * * *